United States Patent

Goss et al.

[11] Patent Number: 5,961,267
[45] Date of Patent: Oct. 5, 1999

[54] THREAD FORMING FASTENER

[75] Inventors: David C. Goss, Rockford; Dennis M. Luna, Winnebago, both of Ill.

[73] Assignee: Textron Inc., Providence, R.I.

[21] Appl. No.: 09/103,006

[22] Filed: Jun. 23, 1998

[51] Int. Cl.[6] .............................. F16B 25/00; F16B 35/04
[52] U.S. Cl. ........................... 411/416; 411/418; 411/386
[58] Field of Search .................................... 411/386, 416, 411/417, 418, 420, 421; 470/9, 10

[56] References Cited

U.S. PATENT DOCUMENTS

| | | |
|---|---|---|
| 3,180,126 | 4/1965 | Carlson . |
| 3,209,383 | 10/1965 | Carlson . |
| 3,530,760 | 9/1970 | Lindstrand . |
| 3,918,345 | 11/1975 | Phipard, Jr. . |
| 3,935,785 | 2/1976 | Lathom . |
| 4,040,328 | 8/1977 | Muenchinger . |
| 4,069,730 | 1/1978 | Gutshall . |
| 4,235,149 | 11/1980 | Veldman . |
| 4,368,552 | 1/1983 | Sugiyama . |
| 4,844,676 | 7/1989 | Adamek ................................. 411/386 |
| 5,088,869 | 2/1992 | Greenslade . |

Primary Examiner—Neill Wilson
Attorney, Agent, or Firm—Trexler, Bushnell, Giangiorgi & Blackstone, Ltd.

[57] ABSTRACT

The present invention envisions a fastener and a blank for forming a fastener. Threads are formed on the fastener blank of the present invention to achieve the fastener of the present invention. The fastener and blank include a shank which defines a central axis of the fastener. A head is provided on one end of the shank and a leading end is provided on an opposite end of the shank distal the head. A plurality of lobes are provided on the shank and are generally axially aligned with the central axis. Flutes are defined between neighboring lobes. The plurality of lobes include at least three major lobes and three minor lobes. The major lobes are defined by a major arc which is struck by a major radius. The minor lobes are defined by a minor arc struck by a minor radius. The major and minor radii extend from different radial points of origin. An inner circle of origin is positioned outwardly from the central axis and an outer circle of origin is positioned outwardly from the central axis and said inner circle of origin. The minor radii extend from a point on the inner circle and the major radii extend from a point on the outer circle. Threads are formed on the outside surface of the fastener blank as described hereinabove to produce the threaded fastener of the present invention.

42 Claims, 10 Drawing Sheets

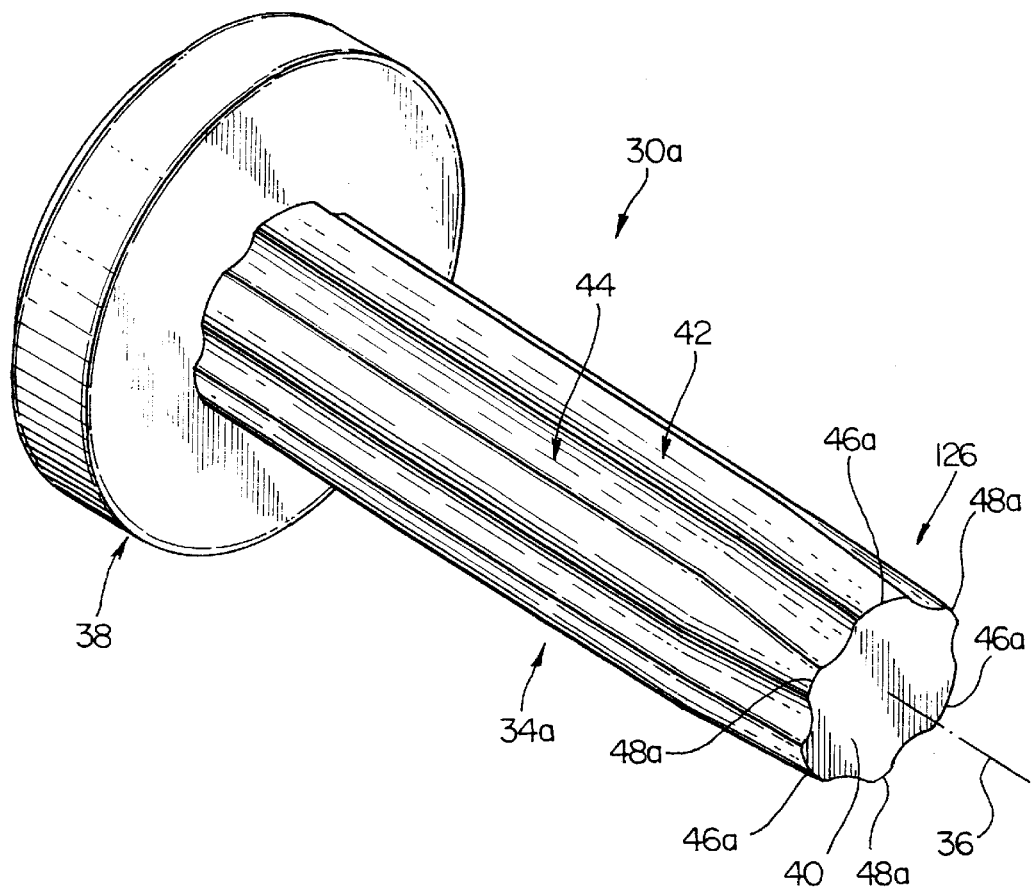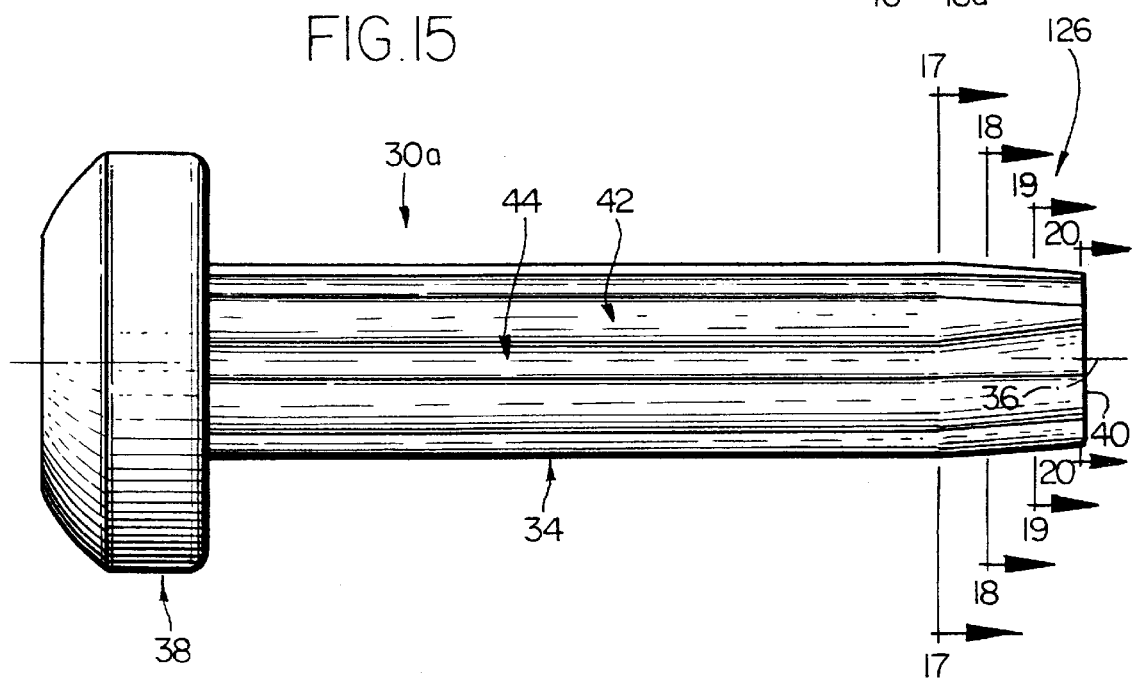

THREAD FORMING FASTENER

BACKGROUND

The present invention envisions a threaded fastener and a blank used to form the threaded fastener which provides improved thread forming characteristics.

A variety of thread forming fasteners are available which form threads in an unthreaded pilot bore. An example of a well known self-tapping threaded fastener is the tri-lobular family of fasteners. This family of fasteners uses a fastener blank having a generally triangular cross-sectional profile. The cross-sectional profile is not truly triangular but rather has the form of arcuate surfaces which are positioned in a triangular orientation. For example, three generally arcuate surfaces are formed on a shank and are connected by smaller radius arcuate surfaces. All of these arcuate surfaces are generally axially oriented along the shank of the fastener blank. The fastener blank is then processed through a roll die to form threads thereon. The thread forming process results in three thread forming lobes protruding from the shank.

The foregoing example of the tri-lobular family of fasteners is but one example of various cross-sectional geometries used in the thread forming fastener art. The general principle is to provide a cross-sectional profile geometry which produces a plurality of protruding lobes for forming threads in a pilot bore. While a variety of fasteners have been devised, they do not necessarily optimize various desirable thread forming characteristics. For example, while the tri-lobular fastener structure provides sufficient thread forming characteristics, it may not optimize the pull-out or strip-out characteristics for various applications. Also, some embodiments of prior art thread forming fasteners may tend to wobble when initially driving the thread forming fastener into the unthreaded pilot hole. It would be desirable to prevent this wobbling so as to provide a more efficient and reliable thread forming fastener and formed thread within the bore.

OBJECTS AND SUMMARY

An object of the present invention is to provide a fastener blank which can be used to produce a threaded fastener and which improves thread forming characteristics of the threaded fastener.

Another object of the present invention is to provide a self-tapping threaded fastener with improved thread forming characteristics.

Another object of the present invention is to provide a self-tapping threaded fastener which includes three major lobes and three minor lobes positioned on a shank of a fastener. The major lobes and minor lobes are alternately positioned on the fastener shank. Neighboring major and minor lobes define a corresponding flute therebetween. The major lobes and minor lobes are defined by arcs which are struck from respective, separate radii positioned at origin points radially displaced from a central axis of the shank. The major arcs defining the major lobes are struck from major origin points on a circle of origin having a radius which is greater than a circle of origin corresponding to and used to strike the minor arcs defining the minor lobes.

Still a further object of the present invention is to provide a self-tapping threaded fastener which includes a plurality of major and minor lobes arranged in an alternating configuration. Each pair of lobes including a major lobe and a minor lobe define a segment of the fastener. The major lobe comprises a larger angular portion of the segment than the minor lobe.

Briefly and in accordance with the foregoing, the present invention envisions a fastener and a blank for forming a fastener. Threads are formed on the fastener blank of the present invention to achieve the fastener of the present invention. The fastener and blank include a shank which defines a central axis of the fastener. A head is provided on one end of the shank and a leading end is provided on an opposite end of the shank distal the head. A plurality of lobes are provided on the shank and are generally axially aligned with the central axis. Flutes are defined between neighboring lobes. The plurality of lobes include at least three major lobes and three minor lobes. The major lobes are defined by a major arc which is struck by a major radius. The minor lobes are defined by a minor arc struck by a minor radius. The major and minor radii extend from different radial points of origin. An inner circle of origin is positioned outwardly from the central axis and an outer circle of origin is positioned outwardly from the central axis and said inner circle of origin. The minor radii extend from a point on the inner circle and the major radii extend from a point on the outer circle. Threads are formed on the outside surface of the fastener blank as described hereinabove to produce the threaded fastener of the present invention.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and un which:

FIG. 14 is a perspective view of an alternate embodiment of the fastener blank of the present invention;

FIG. 15 is a side elevational view of the alternate embodiment;

DESCRIPTION

Figure 1:
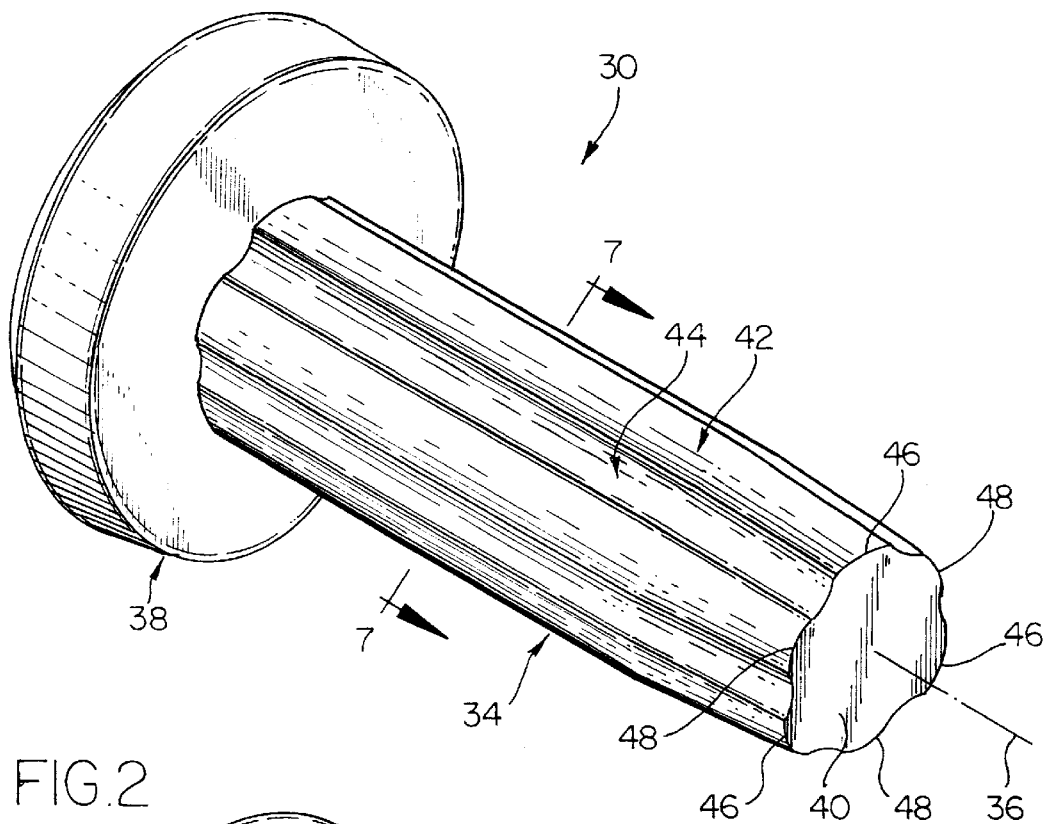
FIG. 1 is a perspective view of a fastener blank of the present invention.

While the present invention may be susceptible to embodiment in different forms, there is shown in the drawings, and herein will be described in detail, preferred embodiments with the understanding that the present description is to be considered an exemplification of the principles of the invention and is not intended to limit the invention to those as illustrated and described herein.

Figure 2:
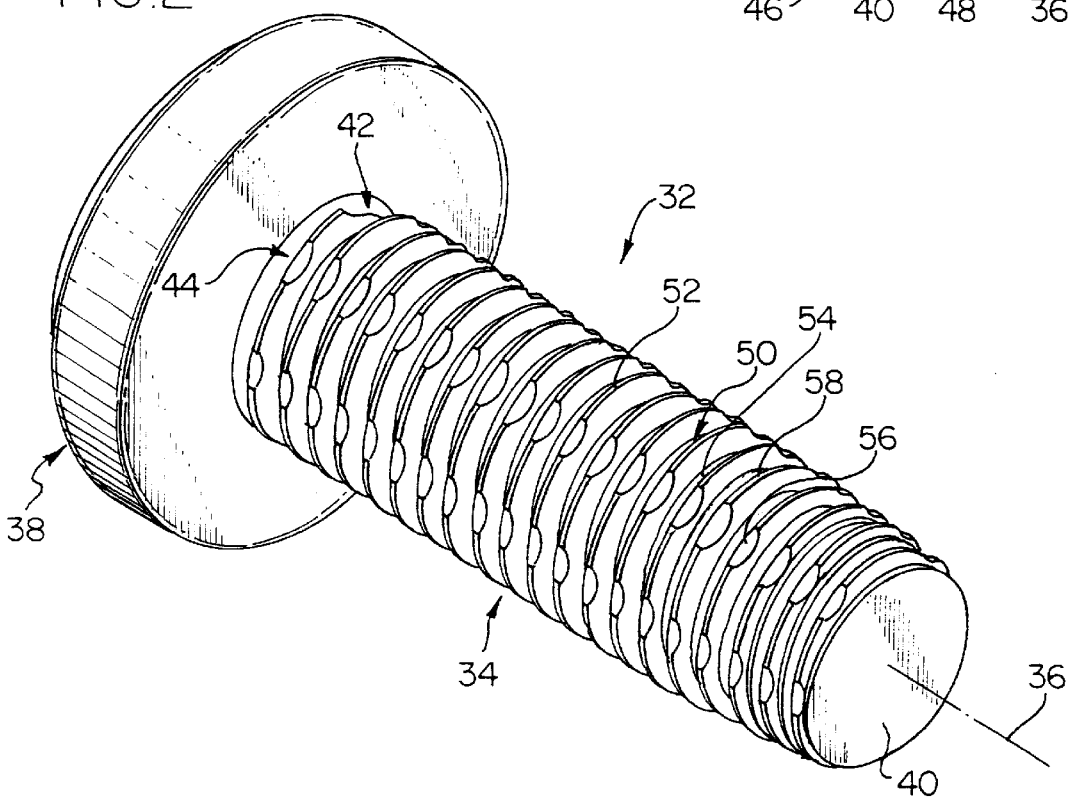
FIG. 2 is a perspective view of a threaded fastener formed from the fastener blank as shown in FIG. 1.
Figure 3:
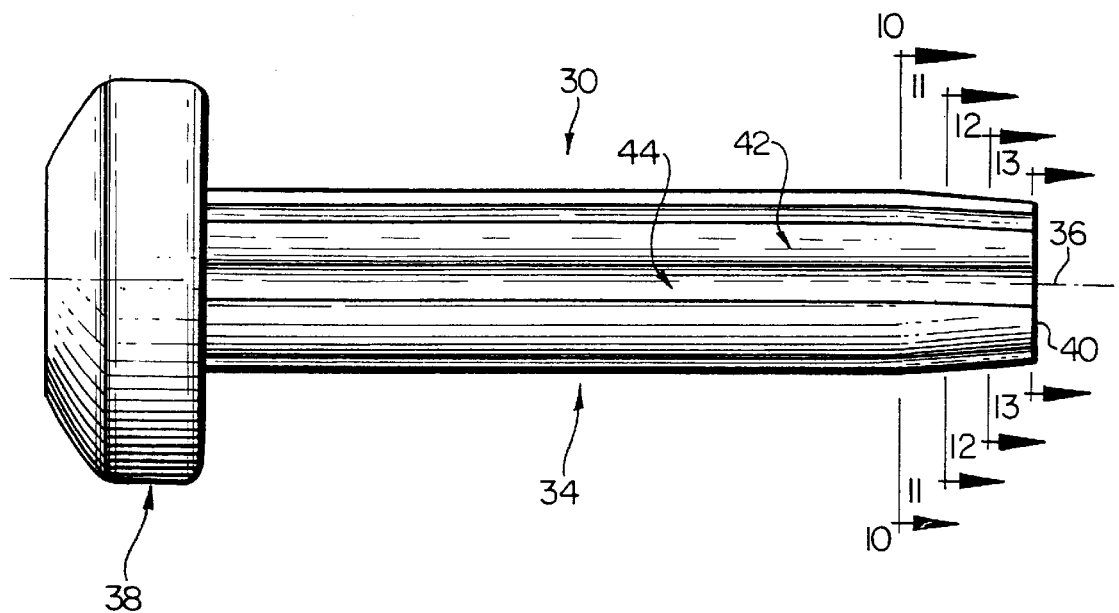
FIG. 3 is a side elevational view of the fastener blank as shown in FIG. 1.
Figure 4:
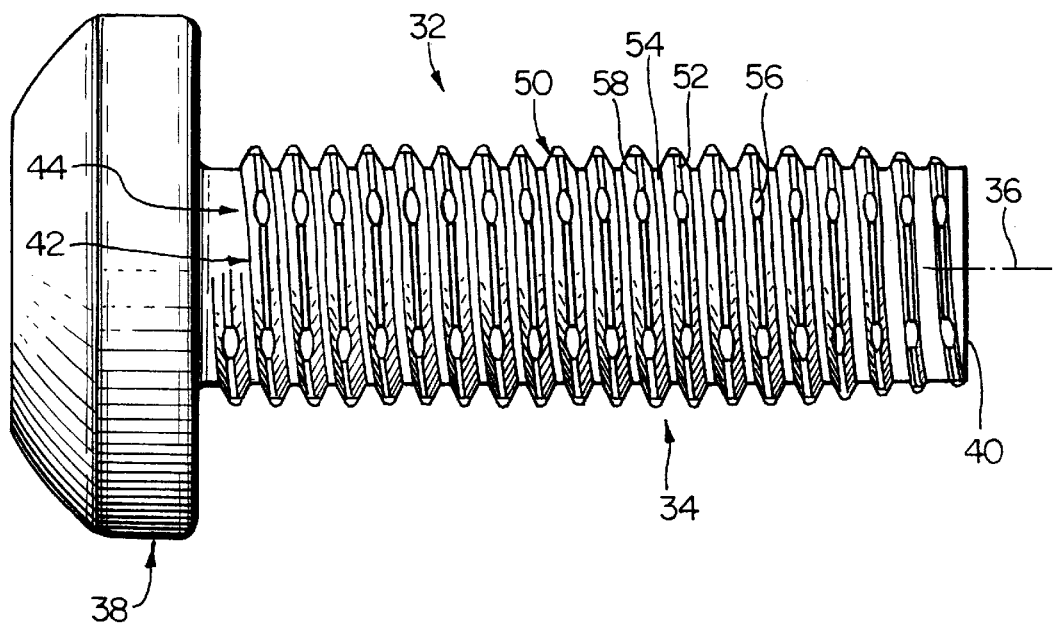
FIG. 4 is a side elevational view of the threaded fastener as shown in FIG. 2.
Figure 5:
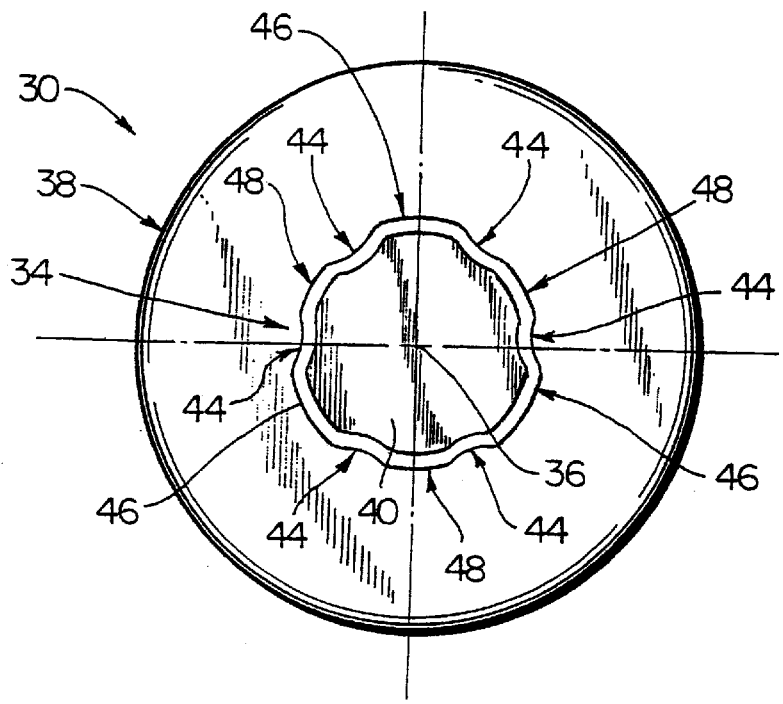
FIG. 5 is an end view of the fastener blank as viewed from the leading end; 1.
Figure 6:
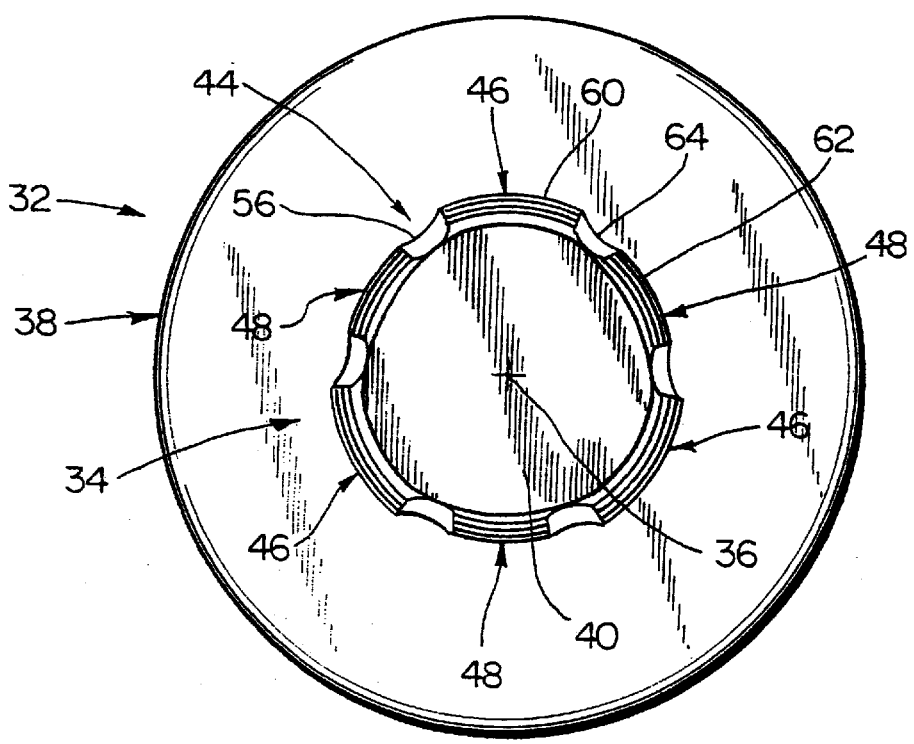
FIG. 6 is an end view of the threaded fastener as viewed from the leading end.

With reference to the Figures, a brief description is provided of the fastener blank 30 as shown in FIGS. 1, 3 and 5 and the threaded fastener 32 as shown in FIGS. 2, 4 and 6 which is formed from the blank 30. It should be noted that the identical structures within the fastener blank 30 and threaded fastener 32 are identified by the same reference number. For example, the fastener blank 30 and threaded fastener 32 have a shank 34 which defines a central axis 36. A head 38 is provided on one end of the shank 34 and a leading end 40 is defined at the end of the shank 34 distal the head 38. A plurality of lobes 42, as will be described in greater detail hereinbelow, are disposed on an exterior surface of the shank 34 and are generally axially aligned with the central axis 36. A plurality of flutes 44 are defined between neighboring lobes 42 and are also generally axially aligned with the central axis 36.

The plurality of lobes 42 include at least three major lobes 46 and three minor lobes 48. As will be described in greater detail hereinbelow, the major lobes 46 and minor lobes 48 are positioned on the shank 34 in an alternating configuration. In other words, each major lobe 46 has a pair of neighboring minor lobes 48, one of each on each side of the major lobe 46. Similarly, each minor lobe 48 has a pair of neighboring major lobes 46, one of each on each side of the minor lobe 48.

With reference to FIGS. 2, 4 and 6, it can be seen that threads 50 are provided on the external surface of the blank 30 as shown in FIGS. 1, 3 and 5. These threads so have a crest 52 and a root 54. One method of forming the threads 50 on the fastener blank 50 is to use a roll die (not shown) to form the spirally oriented thread 50 thereon. As a result of forming threads on the fastener blank in accordance with the invention, a series of generally axially aligned interruptions 56 are formed where a segment 58 of the continuous thread 50 intersects a portion of a flute 44 provided on the fastener blank 30. The interruptions 56 define transitions between the major lobes 46 and the corresponding minor lobes 48.

Figure 7:
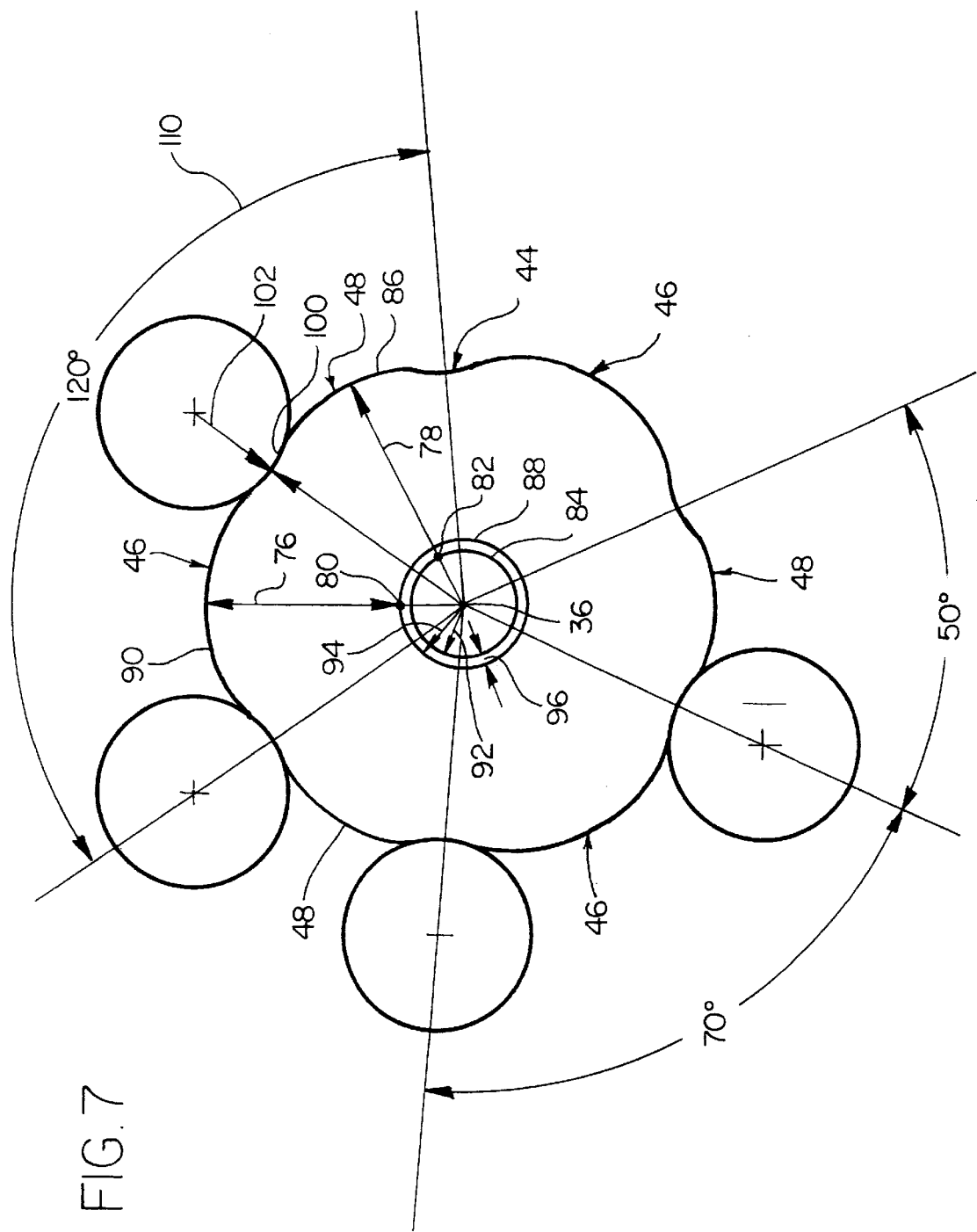
FIG. 7 is a diagrammatic illustration of a cross-section taken along line 7—7 of the fastener blank as shown in FIG. 1 to illustrate dimensional and geometric characteristics of the present invention.
Figure 9:
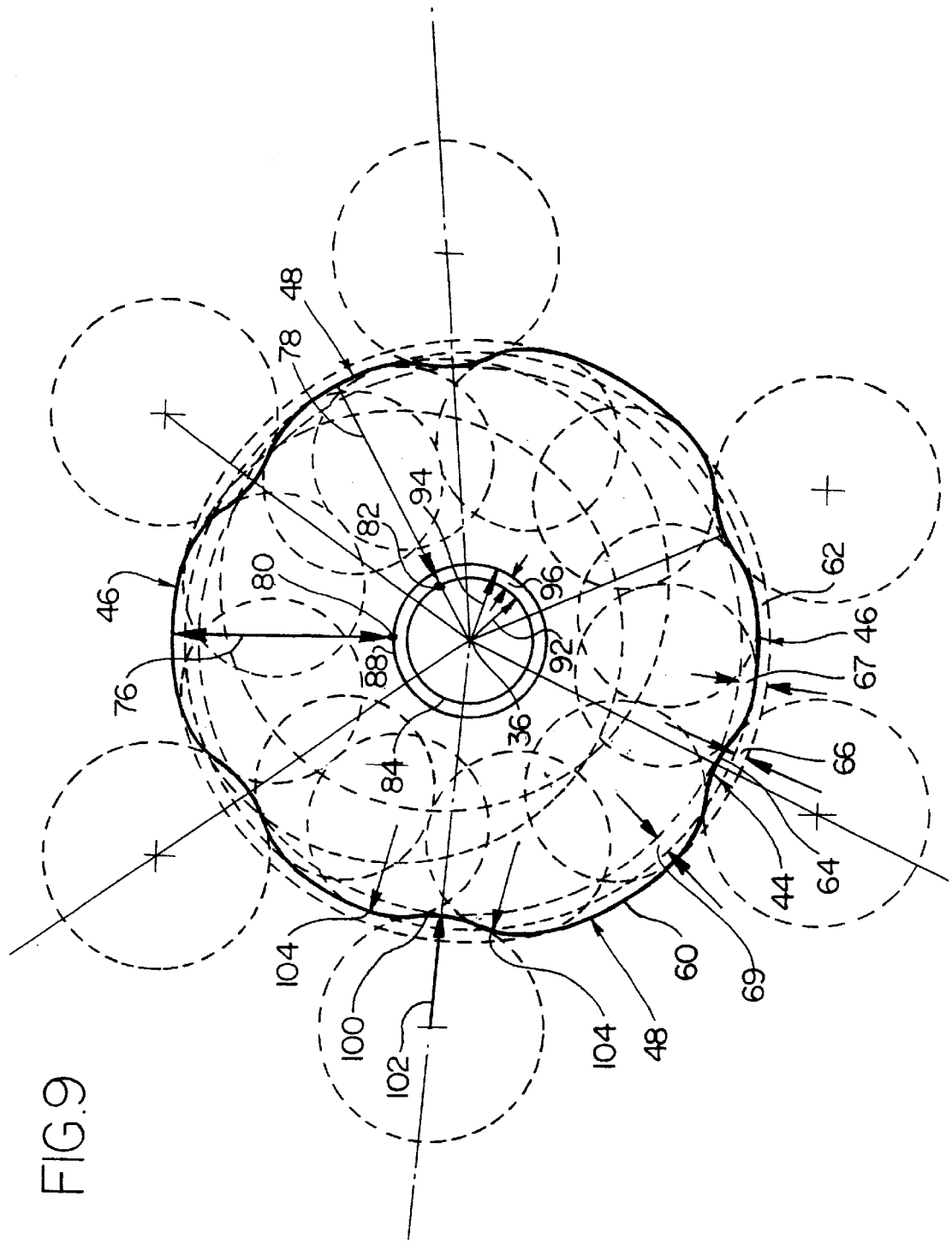
FIG. 9 is a diagrammatic illustration of a cross-section of the fastener blank similar to that as shown in FIG. 7 and which illustrate the circular constructions employed in defining the structures and surfaces of the present invention.
Figure 10:
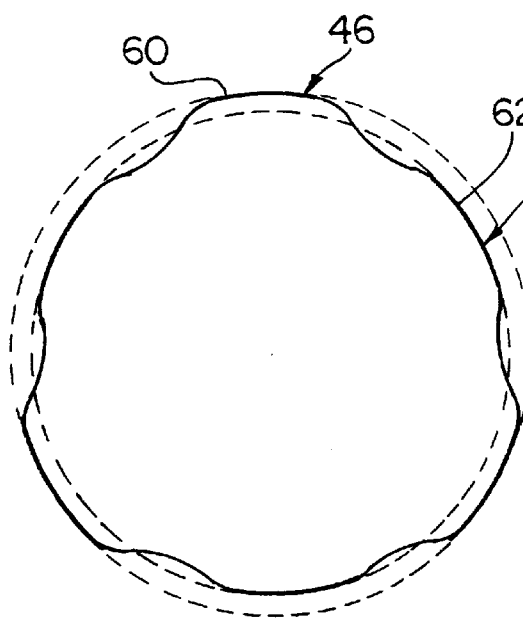
FIG. 10 is a cross-sectional view taken along line 10—10 in FIG. 3.
Figure 11:
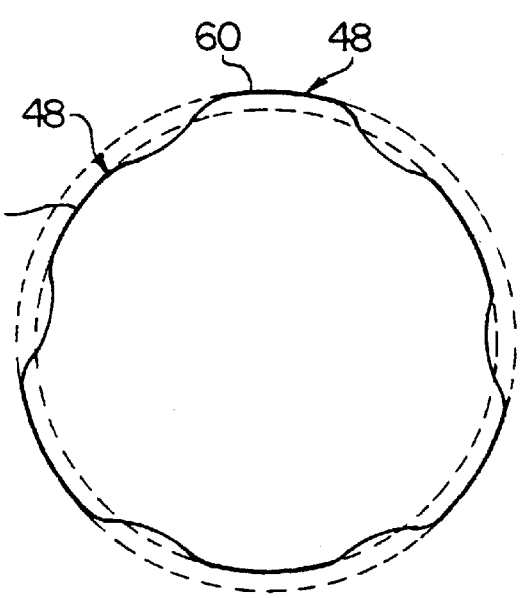
FIG. 11 is a cross-sectional view taken along line 11—11 in FIG. 3.
Figure 12:
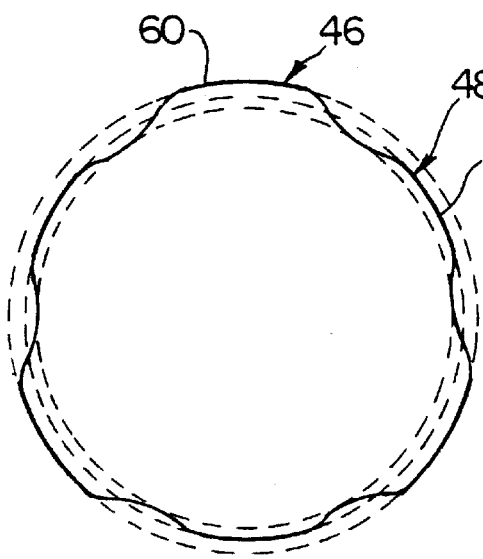
FIG. 12 is a cross-sectional view taken along line 12—12 in FIG. 3.
Figure 13:
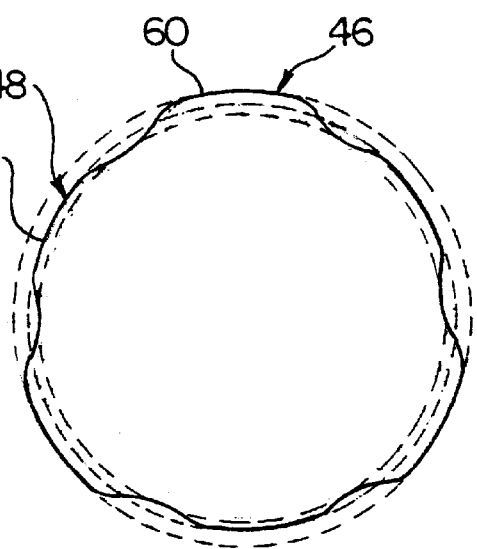
FIG. 13 is a cross-sectional view taken along line 13—13 in FIG. 3.

With regard to the transitions, further reference is made to FIG. 7 to introduce the dimensional variations between the major and minor lobes 46,48. As shown in FIG. 9, three major lobes 46 are alternately spaced with three minor lobes 48. Three concentric circles are shown in broken line which correspond to the crest 60 of the major lobes 46, the crest 62 of the minor lobes 48 and the root 64 of the flute 44. The difference between the crest 60 of the major lobes 46 and the crest 62 of the minor lobes 48 defines a lobe relief 66 which extends in the area between neighboring major lobes 46 over the corresponding minor lobe 48. The lobe relief 66 accommodates a degree of deformation of material in the pilot bore as the major lobes deform the material as the threaded fastener 32 is engaged in an unthreaded pilot bore. Further material relief and material drag reduction is provided on the backside of the thread by the total relief 67 which is the combination of the lobe relief 66 and a flute relief 69. The flute relief 69 is the difference between the crest 62 of the minor lobe 48 and the root 64 of the flute 44 and is only in the area of the flute 44 between neighboring major and minor lobes. The flute relief 69 provides an area to accommodate material deformation and a resulting reduction in material drag during the thread forming process.

The use of three major lobes to initiate thread forming and threaded engagement helps to prevent wobble when driving the fastener. Additionally, secondary thread forming and engagement occurs as a result of the minor lobes 48 leading and trailing the major lobes 46 during a thread forming and fastener engaging operation. The difference between the minor lobe crest 62 and the flute root 64 produces additional thread forming and refinement, further engages the threads formed by the major lobes 46 and helps to further minimize wobble when initiating driving of a fastener into a workpiece.

Figure 8:
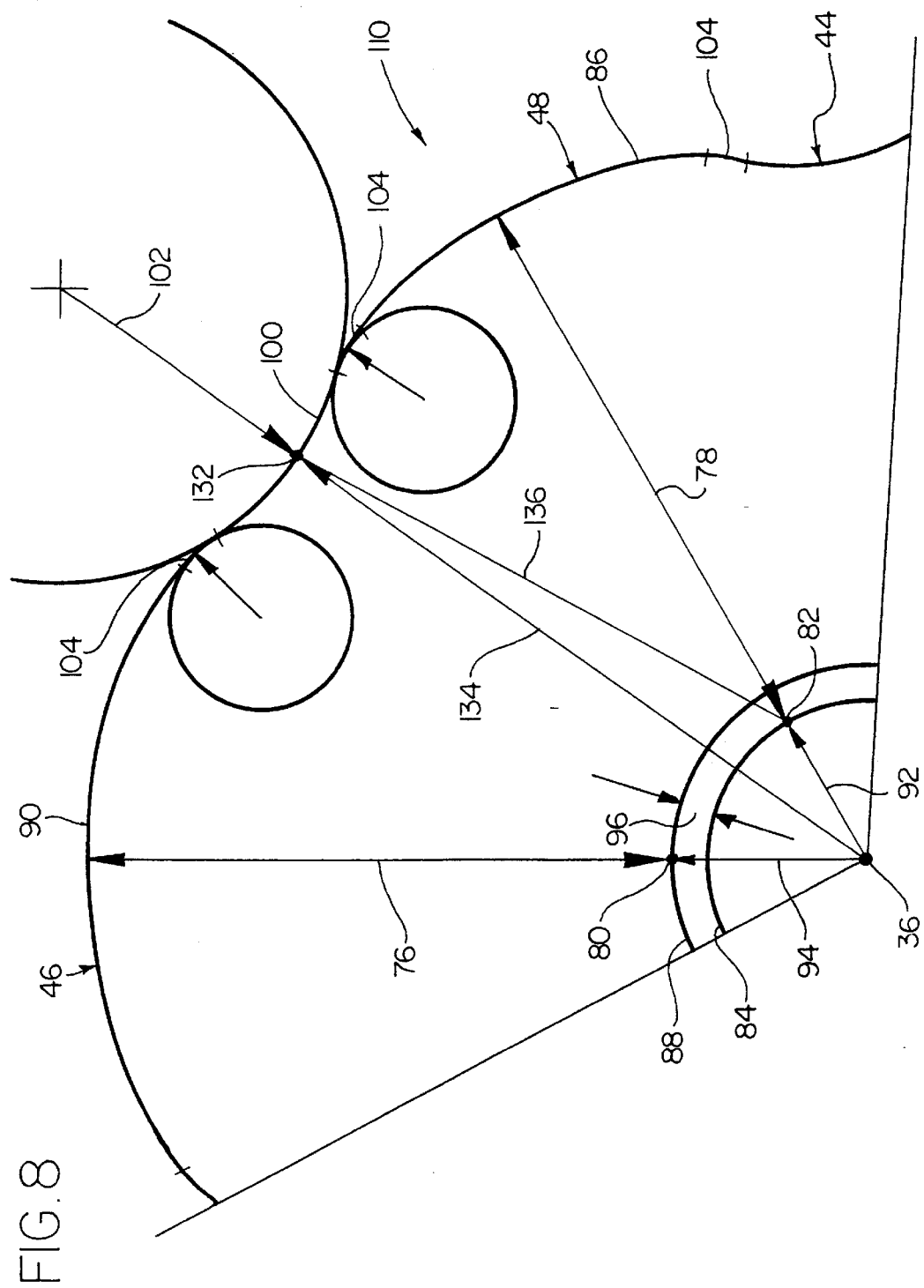
FIG. 8 is an enlarged partial fragmentary view of a segment of the diagrammatic illustration as shown in FIG. 7 to better illustrate the geometries of the present invention.

With further reference to FIGS. 7, 8 and 9, the overall geometry of the fastener blank 30 and subsequently the threaded fastener 32 is generated by a specific novel geometric construction technique. Generally, the major lobes 46 and minor lobes 48 are generated in relation to a central axis 36. However, more specifically, the major lobes and minor lobes 46,48 are defined by a major radius 76 and a minor radius 78. The major and minor radii 76,78 extend from corresponding major origin points 80 and minor origin points 82 which are spaced away from the central axis 36. The minor origin points 82 are defined on an inner origin circle 84 which is radially positioned outwardly from the central axis 36. The minor radii 78 extend from the corresponding minor origin points 82 on the inner origin circle 84 and strike a minor arc 86 defining the corresponding minor lobes 48.

Similarly, the major radii 76 extend from the corresponding major origin points 80 which are defined on an outer origin circle 88. Generally, in the preferred embodiment as illustrated and described herein, the inner and outer origin circles 84,88 are generally concentric about the central axis 36. The outer origin circle 88 is radially positioned outwardly from the central axis 36 and outwardly from the inner origin circle 84. The major radii 76 extend from corresponding major origin points 80 on the outer origin circle 88 and extend outwardly to strike a major arc 90 defining corresponding major lobes 46.

Taking into consideration the foregoing description of the invention as described with reference to FIG. 7, and with further reference to FIG. 9, a minor offset 92 is defined between the central axis 36 and the inner origin circle 84. A major offset 94 is defined between the central axis 36 and the outer origin circle 88. An offset difference 96 is defined as the dimension between the major offset 94 and the minor offset 92. It should be noted that this corresponds to the relief 66 as described hereinabove. As such, the relief 66 can be controlled by the dimensional relationship of the offsets 92,94,96.

In the preferred embodiment, the minor offset 92 is greater than or equal to zero and the major offset 94 is greater than the minor offset 92. This, as described above, provides for the relief 66 between the major and minor crests 60,62.

As discussed above, flutes 44 are defined between neighboring major and minor lobes 46,48. The flutes 44 are primarily defined by an inscribed arc 100 being defined by an inscribed radius 102. The inscribed radius 102 extends from an inscribed origin point 130 outside of the circle defined by the major lobe crests 60 and extends inwardly towards the central axis 36 to a point which defines the flute root 64. With reference to FIG. 8, the inscribed arc 100 is tangential to an intersection point 132 where a flute radius 134 intersects an inscribed radius 136. The inscribed radius 136 originates from the neighboring minor origin point 82 and extends to the intersection point 132 where it intersects the flute radius 134 which is positioned aligned with the central axis 36. The inscribed radius 136 is defined as the minor radius 78 multiplied by a constant (i.e. in the present example the constant equals .98). The arc 100 is positioned to be tangential to the intersection point 132.

As mentioned, the inscribed arc 100 primarily defines each flute 44. However, blend arcs 104 are provided to join the inscribed arc 100 and the corresponding major and minor arcs 90,86. The inscribed arc 100 is defined and used between each of the neighboring lobes 46,48. Similarly, the use of the blending arcs 104 are used throughout to blend the inscribed arcs 100 to each of the neighboring major and minor lobes 46, 48. As such, there is a consistency of the geometry used throughout the present invention. It should be noted that a radius 102 could be calculated to join the major and minor arcs 90, 86 and eliminating the need for the blend arcs 104.

The choice of the major and minor radii 76,78 depends on the degree of offset desired, relief desired and the curvature of the corresponding major and minor lobes 46,48. In this regard, the major and minor radii 76,78 can be chosen to be equal or different. If the major and minor radii 76,78 are of equal dimension, the offset difference 96 will determine the degree of relief 66 between the crests 60,62. However, the equal radii will result in curvatures of the corresponding major and minor arcs 90,86 being generally equal.

Turning now to FIGS. 7 and 8, the geometric construction of the present invention can be described by way of a segment 110 of the shank cross-section as generally illustrated in FIGS. 7 and 8. The segment 110 as shown in FIG. 8 is generally a segment of the geometric construction as shown in FIG. 7 approximating 120°. As indicated hereinabove, the present invention shows a plurality of lobes and flutes and more specifically shows three major lobes 46 and three minor lobes 48. Each segment 110 includes a pair of neighboring major and minor lobes 46,48. The major lobe 46 generally comprises a larger angular portion of the segment 110 compared to the minor lobe 48. More specifically, the major lobe 46 defines a portion of the segment of approximately 70° whereas the minor lobe 48 defines a portion of the segment 110 of approximately 50°. Even though the division of the segment 110 is not equal between the major lobe 46 and minor lobe 48, the major lobes 46 are generally spaced apart 120° on center. Similarly, the minor lobes 46 are spaced apart 120° on center. Therefore, even though the minor lobes 48 are generally equally spaced apart on the shank 34 and the major lobes 46 are also, independently, equally spaced about the shank 34, a combination of neighboring major and minor lobes 46,48 are asymmetric. It should be noted, however, that the segments 110 are also generally equally spaced apart on the shank 34.

As shown throughout the drawings and as explicitly shown in FIG. 8, the geometries of the present invention provide for flutes 44 on the fastener blank 30 shank 34 which result in interruptions 56 in the thread form 50. These interruptions 56 are in the nature of concave areas within the thread form 50. This in contrast to a common circular cross-section threaded fastener which has no concave areas or interruptions 56.

Also, with regard to the tri-lobular geometries of prior art fasteners, the present invention provides concave recesses which are not provided in such tri-lobular constructions. The prior art tri-lobular shank provides for a degree of relief such that the three radially extending lobes extend much further than the generally flattened or convex arcuate surface therebetween. As such, a natural degree of clearance is provided between the inter-lobular area and the bore into which the fastener is driven. However, the tri-lobular configuration has a disadvantage in that the inter-lobular areas are not concave and therefore provide less room, compared to the present invention, for displacement during thread forming operations.

Furthermore, the tri-lobular design more closely approximates a triangle than a circle and as such results in three-point engagement of the shank with the formed threads. It would be preferred to provide increased engagement as is provided by the present invention to more closely approximate a circular thread to increase pull-out resistance. The concave flute 44 areas between the major and minor lobes 46, 48 provide the necessary relief for thread forming while the major and minor lobes 46, 48 both engage the formed threads to increase pull-out resistance.

In use, the first three or four threads 50 of the threaded fastener 32 employing the major and minor lobe 46, 48 constructions of the present invention will do most of the work of thread forming. The subsequent threads 50 will follow-up the as-formed threads by cleaning up the thread form providing intimate engagement in the as-formed threads. As noted above, the three major lobes 46 along the shank provide thread forming and work the thread formation process. The three minor lobes 48 finish the threads and increase the pull-out strength of the threaded fastener 32. As also noted above, the concave interruptions 56 positioned between neighboring lobes promote increased material engagement and deformation during the thread forming process. The interruptions 56 provide relief areas not found in other prior art fastener constructions.

As an additional comparison to prior art fasteners, it should be noted that the radii used to generate the surfaces in the present invention originate from different origin points. In other words, the displacement of the inner and outer origin circles 84, 88 as described above provide different radial origination points such as the major and minor points 80,82 as discussed above. This provides a degree of offset and the ability to produce different arcuate shapes in the fastener.

Another benefit of the present invention, the threaded fastener requires less end load to start the thread forming process. In this regard, when a fastener is positioned relative to a pilot hole to initiate the thread forming process, a lower end load is required to maintain the fastener in a axially displacing thread forming driving action. The reduced end load is due in part to the increased stability provided by the major and minor lobes 46,48 engaging the mouth or rim of the pilot hole. This reduces wobble and therefore requires less end load to maintain the desired axial orientation. Additionally, the relief provided by the interruptions 56 defined by the flutes 44 help provide relief in the deformation action of the thread forming process and the minor lobes help to facilitate thread forming and refinement thereby reducing the general frictional engagement between the fastener and the pilot hole material during the insertion and thread forming process. As a result of lower end load, reduced thread forming torque is required which increases the reliability of the fastener and reduces the likelihood of introducing excessive stress on the fastener resulting of increased or excessive torque. The reduced end load and decreased torque requirements reduce the variations in torque and end load from fastener to fastener and as such increases the predictability of the fastener. The smooth arcuate characteristics of the major and minor lobes 46,48 produce a more consistent material deformation than do the more abrupt and pointed thread forming structures on prior art thread forming fasteners.

Figure 16:
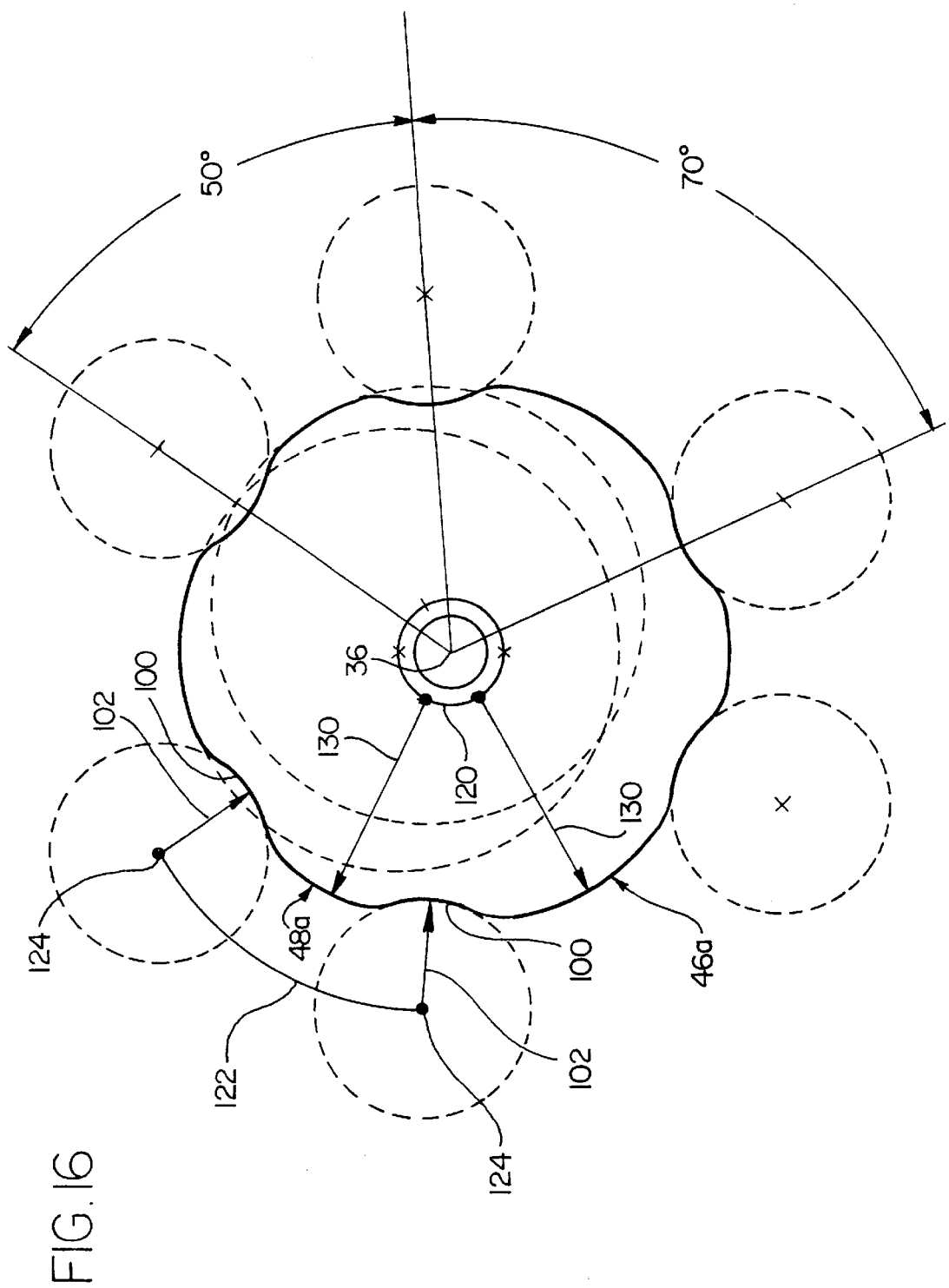
FIG. 16 is a diagrammatic illustration of the alternate embodiment.

An alternate embodiment of the present invention includes an altered entry end geometry. In otherwords, while the shank 34 remains essentially the same as in the preferred embodiment an end 126 has a different geometric configuration than that as described above. The alternate embodiment is shown in FIGS. 14–20. Reference is made to FIG. 16 to diagrammatically illustrate the geometric principles of the alternate embodiment. FIG. 16 is generally representative of the portion of the end 126 along line 20—20 in FIG. 15 and shown in FIG. 20.

In the alternate embodiment, the major and minor lobes 46a, 48a of the end 126 are defined by radii which extend from a common circle of origin 120. In this regard, the alternate embodiment does not employ two spaced apart circles of origin, but rather, employs a single circle of origin 120 which is radially spaced from the central axis 36 and employs identical radii defining the major and minor lobes. The lobes are varied in size defining major lobe 46a and a minor lobe 48a by varying the angular dimension 122 between the origin points 124 of the corresponding inscribed radii 102. As such, by alternating, asymmetrically spacing the pair of inscribed arcs 100, a major and minor alternating lobe 46a, 48a pattern is achieved.

Figure 17:
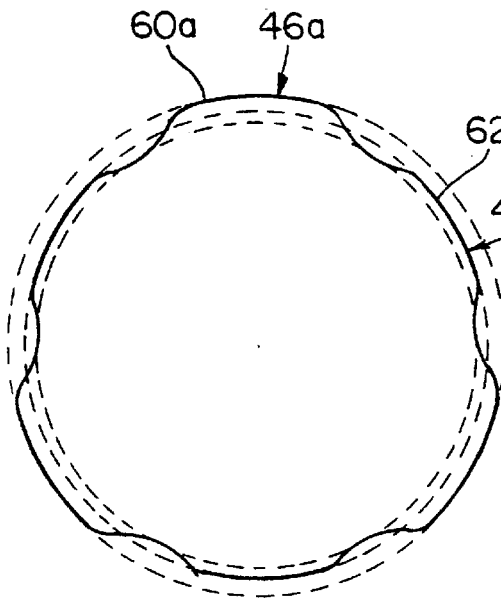
FIG. 17 is a cross-sectional view taken along line 17—17 in FIG. 15.
Figure 18:
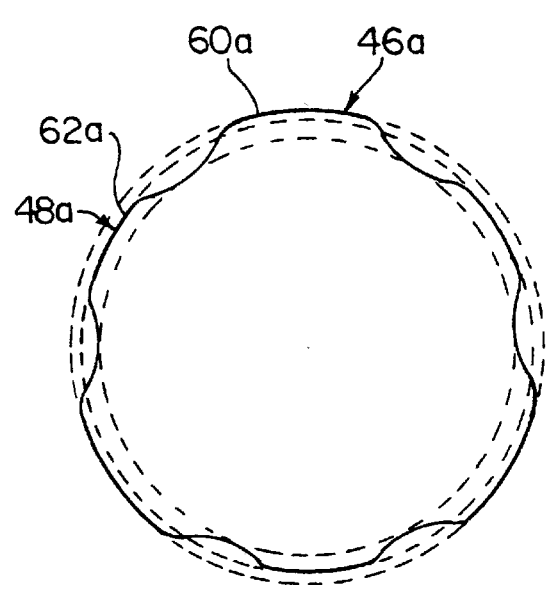
FIG. 18 is a cross-sectional view taken along line 18—18 in FIG. 15.
Figure 19:
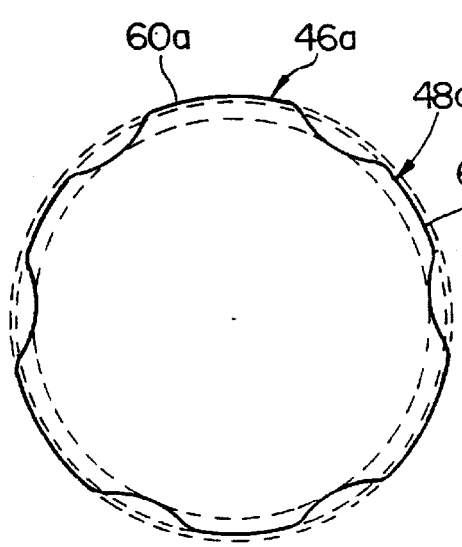
FIG. 19 is a cross-sectional view taken along line 19—19 in FIG. 15.
Figure 20:
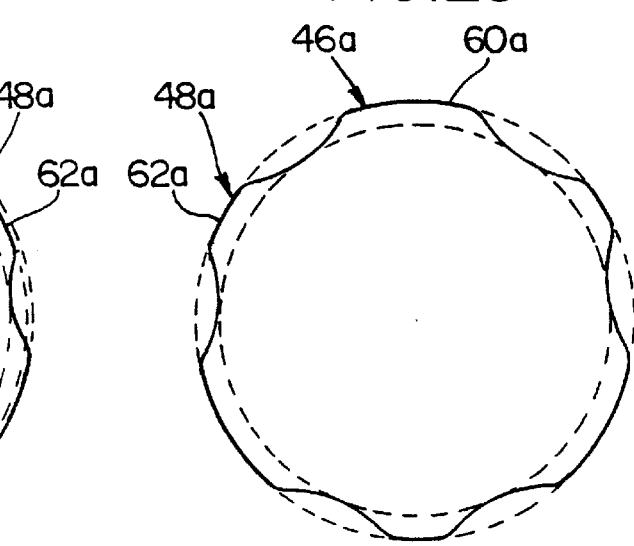
FIG. 20 is a cross-sectional view taken along line 20—20 in FIG. 15.

As generally shown in FIGS. 14–20, the alternate embodiment is primarily provided on the point or end 126. As shown in the progressions of FIGS. 17–20, the angular spacing of the point or end 126 is altered from FIG. 17 to 20, so as to more closely space the flutes 44 on either side of the minor lobes 48. In contrast, the progressions of the preferred embodiment as shown in FIGS. 10–13 still maintain the major and minor lobes 46, 48 in a configuration more like the shank. Generally, FIG. 17 shows a geometric construction as employed in the preferred embodiment as described hereinabove. FIGS. 18, 19 and 20 show a progression in which there is a transition from the teachings of the preferred embodiment (as shown in FIG. 17) to the teachings of the alternate embodiment (as shown in FIG. 20).

The preferred and alternate embodiments of the present invention are initially formed by forming the fastener blank 30, using known header die techniques. In this regard, a material such as suitable metallic wire is cut and driven into a header die to form the overall shank shape as described hereinabove. The geometric construction used to achieve this shank geometry will provide the benefits as described hereinabove. A point die may be coupled with a body die so that alternate point forms such as that described for the alternate embodiment may be used to form the alternate embodiment of the present invention.

Once the fastener blank 30 is formed, the fastener blank is then introduced to a thread rolling die of known construction. The thread rolling die will form a spiral thread on the exterior surface of the fastener blank. As the threads are formed using a generally continuous thread, interruptions in the thread will be formed as the result of the thread being formed over the flutes on the shank. Similarly, there will be variations in the thread structure between the major and minor lobe portions of the shank. In this regard, even though the major and minor lobes will be formed with threads, the crest shape and dimensions may vary between the major and minor lobes. This results from the major lobes extending radially outwardly further than the minor lobes.

In use, the threaded fastener produced in accordance with the teachings of the present invention as described hereinabove will be used to form threads within an unthreaded pilot bore. The spaced-apart plurality of major and minor lobes 46, 48 at the leading end 40 of the fastener 32 support the fastener on the rim of the pilot bore and reduce the tendency for the fastener to wobble as it is driven. This generally symmetric spacing of the major lobes and generally symmetric spacing of the minor lobes provides a stable entry structure. The stability of the fastener during the thread-forming operation results in a lower end load requirements in order to maintain the thread-forming, axial driving movement of the fastener as it is driven into the pilot hole during the thread-forming operation.

The major lobes tend to provide the primary thread-forming structure for the fastener. As the major lobes form the threads, the minor lobes trail and refine the as-formed threads. The concave flutes and generally, continuously curving geometry of the flutes and lobes helps to promote smooth material deformation during the thread-forming operation. As a result of the thread-forming operation and the geometry of the threaded fastener 32 of the present invention, the pull-out resistance is increased. The pull-out resistance is increased as a result of the major and minor lobes 46, 48 engaging the formed threads in the pilot hole. The geometry of the threaded fastener 32 of the present invention more closely approximates a circular threaded fastener resulting in greater threaded engagement with the workpiece in which the pilot bore is formed.

While preferred embodiments of the present invention are shown and described, it is envisioned that those skilled in the art may devise various modifications and equivalents without departing from the spirit and scope of the appended claims.

The invention claimed is:

1. A fastener blank on which threads are formed to produce a threaded fastener, said fastener blank comprising:

a shank defining a central axis of said fastener blank;

a head defined on one end of said shank;

a leading end of said shank distal said head;

a plurality of lobes on said shank generally axially aligned with said central axis, said lobes defining at least three major lobes and at least three minor lobes, said major lobes and minor lobes being positioned on said shank in an alternating configuration;

flutes defined between neighboring major and minor lobes;

an inner circle of origin radially positioned outwardly from said central axis, a minor radius extending from a point on said inner circle of origin striking a minor arc defining each of said minor lobes; and an outer circle of origin radially positioned outwardly from said central axis and said inner circle of origin, a major radius extending from a point on said outer circle of origin and striking a major arc defining each of said major lobes.

2. A fastener blank as recited in claim 1, wherein said inner circle of origin and said outer circle of origin are concentric with said central axis.

3. A fastener blank as recited in claim 1, further comprising said major radius and said minor radius being equal.

4. A fastener blank as recited in claim 1, further comprising said major radius and said minor radius being unequal.

5. A fastener blank as recited in claim 1, further comprising said flutes being defined by an inscribed radius defining a reverse inscribed arc positioned between neighboring major and minor lobes.

6. A fastener blank as recited in claim 5, further comprising a blending arc extending between said inscribed arc and a neighboring one of said major arc and minor arc.

7. A fastener blank as recited in claim 1, further comprising a tapered point defined on said shank proximate to said leading end.

8. A fastener blank as recited in claim 7, further comprising said lobes on said tapered point being defined by coincident inner and outer circles of origin.

9. A fastener blank as recited in claim 7, wherein said tapered point generally defines a conical structure.

10. A fastener blank as recited in claim 1, further comprising said major lobes being spaced approximately 120° apart, and said minor lobes being spaced approximately 120° apart.

11. A fastener blank as recited in claim 10, wherein neighboring pairs of major and minor lobes define a 120° segment, said major lobe comprising a larger angular portion of said segment than said minor lobe.

12. A fastener blank as recited in claim 11, wherein said major lobe comprises approximately 70° of said segment and said minor lobe comprises approximately 50° of said segment.

13. A fastener blank for use in forming a threaded fastener, said fastener blank comprising:
   a shank defining a central axis;
   a head on one end of said shank;
   a leading end of said shank distal said head;
   a plurality of lobes defined on said shank being generally axially aligned with said central axis;
   a plurality of flutes being defined between neighboring lobes and being generally axially aligned with said central axis;
   said plurality of lobes including at least three major lobes, each of said major lobes being defined by a major arc struck by a radius extending from a major origin point radially offset from said central axis;
   said lobes including at least three minor lobes, each of said minor lobes being defined by a minor arc struck by a minor radius extending from a minor origin point radially offset from said central axis; and
   a major offset defined between said central axis and said major origin point being greater than a minor offset defined between said central axis and said minor origin point.

14. A fastener blank as recited in claim 13, further comprising said minor offset being greater than 0.

15. A fastener blank as recited in claim 13, wherein said major lobes are equally spaced apart.

16. A fastener blank as recited in claim 13, wherein said minor lobes are equally spaced apart.

17. A fastener blank as recited in claim 13, wherein said major lobes and minor lobes are positioned in an alternating configuration on said shank.

18. A fastener blank as recited in claim 13, further comprising said flutes being defined by inscribed arcs positioned between neighboring major and minor lobes, said inscribed arcs being defined by inscribed radii which are positioned to strike an arc to produce a concave flute between each neighboring major lobe and minor lobe.

19. A fastener blank as recited in claim 18, further comprising a blending arc positioned on each side of said inscribed arc to join the neighboring major lobe and minor lobe to the corresponding inscribed arc.

20. A fastener blank as recited in claim 13, further comprising each major lobe and minor lobe pair defining a segment of said fastener blank and wherein said major lobe defines a greater angular portion of said segment than said minor lobe.

21. A fastener blank as recited in claim 18, wherein said inscribed arc and said major lobe define an inscribed major offset and said inscribed arc and said minor lobe define an inscribed minor offset, wherein said inscribed major offset is greater than said inscribed minor offset.

22. A fastener comprising:
   a shank defining a central axis of said fastener;
   a head on one end of said shank;
   a leading end of said shank distal said head;
   a plurality of lobes on said shank generally axially aligned with said central axis, said lobes defining at least three major lobes and at least three minor lobes, said major lobes and minor lobes being positioned on said shank in an alternating configuration;
   flutes defined between neighboring major and minor lobes;
   an inner circle of origin radially positioned outwardly from said central axis, a minor radius extending from a point on said inner circle of origin striking a minor arc defining each of said minor lobes;
   an outer circle of origin radially positioned outwardly from said central axis and said inner circle of origin, a major radius extending from a point on said outer circle of origin and striking a major arc defining each of said major lobes; and
   threads formed on at least a portion of said shank.

23. A fastener as recited in claim 22, wherein said inner circle of origin and said outer circle of origin are concentric with said central axis.

24. A fastener as recited in claim 22, further comprising said major radius and said minor radius being equal.

25. A fastener as recited in claim 22, further comprising said major radius and said minor radius being unequal.

26. A fastener as recited in claim 22, further comprising said flutes being defined by an inscribed radius defining a reverse inscribed arc positioned between neighboring major and minor lobes.

27. A fastener as recited in claim 26, further comprising a blending arc extending between said inscribed arc and a neighboring one of said major arc and minor arc.

28. A fastener as recited in claim 22, further comprising a tapered point defined on said shank proximate to said leading end.

29. A fastener as recited in claim 28, further comprising said lobes on said tapered point being defined by coincident inner and outer circles of origin.

30. A fastener as recited in claim 28, wherein said tapered point generally defines a conical structure.

31. A fastener as recited in claim 22, further comprising said major lobes being spaced approximately 120° apart, and said minor lobes being spaced approximately 120° apart.

32. A fastener as recited in claim 31, wherein neighboring pairs of major and minor lobes define a 120° segment, said major lobe comprising a larger angular portion of said segment than said minor lobe.

33. A fastener as recited in claim 32, wherein said major lobe comprises approximately 70° of said segment and said minor lobe comprises approximately 50° of said segment.

34. A fastener comprising:
   a shank defining a central axis;
   a head on one end of said shank;
   a leading end of said shank distal said head;
   a plurality of lobes defined on said shank being generally axially signed with said central axis;
   a plurality of flutes being defined between neighboring lobes and being generally axially aligned with said central axis;
   said plurality of lobes including at least three major lobes, each of said major lobes being defined by a major arc struck by a major radius extending from a major origin point radially offset from said central axis;
   said lobes including at least three minor lobes, each of said minor lobes being defined by a minor arc struck by a minor radius extending from a minor origin point radially offset from said central axis;
   a major offset defined between said central axis and said major origin point being greater than a minor offset defined between said central axis and said minor origin point; and
   threads formed on at least a portion of said shank.

35. A fastener as recited in claim 34, further comprising said minor offset being greater than 0.

36. A fastener as recited in claim 34, wherein said major lobes are equally spaced apart.

37. A fastener as recited in claim 34, wherein said minor lobes are equally spaced apart.

38. A fastener as recited in claim 34, wherein said major lobes and minor lobes are positioned in an alternating configuration on said shank.

39. A fastener as recited in claim 34, further comprising said flutes being defined by inscribed arcs positioned between neighboring major and minor lobes, said inscribed arcs being defined by inscribed radii which are positioned to strike an arc to produce a concave flute between each neighboring major lobe and minor lobe.

40. A fastener as recited in claim 39, further comprising a blending arc positioned on each side of said inscribed arc to join the neighboring major lobe and minor lobe to the corresponding inscribed arc.

41. A fastener as recited in claim 34, further comprising each major lobe and minor lobe pair defining a segment of said fastener blank and wherein said major lobe defines a greater angular portion of said segment than said minor lobe.

42. A fastener as recited in claim 39, wherein said inscribed arc and said major lobe define an inscribed major offset and said inscribed arc and said minor lobe define an inscribed minor offset, wherein said inscribed major offset is greater than said inscribed minor offset.

* * * * *